(12) United States Patent
Werner et al.

(10) Patent No.: US 7,897,202 B2
(45) Date of Patent: Mar. 1, 2011

(54) GELLED SOLVENT COMPOSITION AND METHOD FOR RESTORING EPOXY GRAPHITE COMPOSITE MATERIALS

(75) Inventors: Gregory J. Werner, Puyallup, WA (US); Burt Shah, Renton, WA (US)

(73) Assignee: The Boeing Company, Chicago, IL (US)

( * ) Notice: Subject to any disclaimer, the term of this patent is extended or adjusted under 35 U.S.C. 154(b) by 963 days.

(21) Appl. No.: 11/750,362

(22) Filed: May 18, 2007

(65) Prior Publication Data

US 2008/0286451 A1   Nov. 20, 2008

(51) Int. Cl.
| | |
|---|---|
| *B05D 3/00* | (2006.01) |
| *B32B 43/00* | (2006.01) |
| *C09D 11/00* | (2006.01) |
| *C09J 101/00* | (2006.01) |
| *C09K 17/40* | (2006.01) |
| *H01L 21/316* | (2006.01) |
| *B01F 17/00* | (2006.01) |

(52) U.S. Cl. ........... 427/140; 106/31.58; 106/163.01; 106/287.1; 106/287.17; 106/287.18; 106/287.19; 106/287.24; 106/287.26

(58) Field of Classification Search ........... 427/140; 106/163.01, 287.17, 287.18, 287.19, 287.24, 106/287.26, 311, 31.85; 252/364
See application file for complete search history.

(56) References Cited

U.S. PATENT DOCUMENTS

| | | | |
|---|---|---|---|
| 3,950,290 A | * | 4/1976 | Drury et al. ........... 524/276 |
| 3,983,047 A | | 9/1976 | Vinson |
| 4,306,989 A | | 12/1981 | Motsenbocker |
| 4,324,595 A | | 4/1982 | Kasprzak |
| 4,381,248 A | | 4/1983 | Lazar |
| 4,406,707 A | | 9/1983 | Moore et al. |
| 4,556,509 A | | 12/1985 | Demangeon et al. |
| 4,617,251 A | | 10/1986 | Sizensky |
| 4,650,822 A | | 3/1987 | Veazey et al. |
| 4,704,222 A | | 11/1987 | Smith |
| 4,732,695 A | | 3/1988 | Francisco |
| 4,780,235 A | | 10/1988 | Jackson |
| 4,863,525 A | | 9/1989 | Goel et al. |
| 4,905,371 A | | 3/1990 | Pai |

(Continued)

FOREIGN PATENT DOCUMENTS

EP    0 296 656    * 12/1988

OTHER PUBLICATIONS

"FT-IR Spectroscopy Attenuated Total Reflectance (ATR) Technical Note," PerkinElmer, Inc. (Shelton, CT), 2005.

*Primary Examiner* — J. A. Lorengo
*Assistant Examiner* — Pegah Parvini
(74) *Attorney, Agent, or Firm* — McNees Wallace & Nurick LLC

(57) ABSTRACT

A process using environmentally friendly materials for restoring a surface of an epoxy graphite composite material that has been degraded by exposure to ultraviolet radiation. An example process includes steps of providing a gelled solvent composition, applying the gelled solvent composition to a degraded surface of an epoxy graphite composite material, and thereafter removing the gelled solvent composition to produce a restored surface. The process uses a novel gelled solvent composition comprising one or more non-halogenated organic solvents, a thickening agent, an abrasive agent, and water; wherein the gelled solvent composition has an evaporative weight loss that is lower than the evaporative weight loss of the one or more non-halogenated solvents.

18 Claims, 6 Drawing Sheets

U.S. PATENT DOCUMENTS

| | | |
|---|---|---|
| 5,015,506 A | 5/1991 | Purcell |
| 5,120,371 A | 6/1992 | Bolden et al. |
| 5,137,573 A * | 8/1992 | Daimon et al. .......... 106/287.16 |
| 5,340,407 A | 8/1994 | Bolden et al. |
| 5,415,800 A | 5/1995 | Motsenbocker |
| 5,525,254 A | 6/1996 | Reininger |
| 5,599,859 A * | 2/1997 | Tonogaki et al. ................ 524/95 |
| 5,654,268 A | 8/1997 | Norcia |
| 5,698,044 A | 12/1997 | Graham et al. |
| 5,894,854 A | 4/1999 | Miles |
| 5,916,857 A | 6/1999 | Watson et al. |
| 5,932,530 A | 8/1999 | Radu et al. |
| 5,952,277 A | 9/1999 | Radu et al. |
| 5,990,065 A | 11/1999 | Vinson et al. |
| 6,013,612 A | 1/2000 | Saito et al. |
| 6,069,122 A | 5/2000 | Vinson et al. |
| 6,090,238 A | 7/2000 | Smith |
| 6,265,367 B1 | 7/2001 | Callaghan et al. |
| 6,399,554 B1 | 6/2002 | Harrington et al. |
| 6,518,230 B2 | 2/2003 | Wu et al. |
| 6,632,782 B1 | 10/2003 | Mogridge |
| 6,689,727 B1 | 2/2004 | Olsson |
| 6,828,291 B2 | 12/2004 | Kneafsey et al. |
| 6,884,316 B2 | 4/2005 | Ono |
| 6,911,421 B2 | 6/2005 | Ikebata |
| 6,923,873 B2 | 8/2005 | Pageau et al. |
| 7,001,876 B2 | 2/2006 | Chikosi |
| 7,112,652 B2 | 9/2006 | Ford et al. |
| 7,151,080 B2 | 12/2006 | Dostie et al. |
| 2003/0097960 A1* | 5/2003 | Ito et al. ..................... 106/31.58 |
| 2003/0149133 A1* | 8/2003 | Lau et al. ...................... 523/160 |
| 2004/0244644 A1* | 12/2004 | Del Moro et al. .......... 106/31.58 |

* cited by examiner

GELLED SOLVENT COMPOSITION AND METHOD FOR RESTORING EPOXY GRAPHITE COMPOSITE MATERIALS

FIELD

The present invention includes a process for restoring a surface of an epoxy graphite composite material that has been degraded by exposure to ultraviolet radiation, as well as gelled solvent compositions therefor.

BACKGROUND

Epoxy graphite composite materials, also known as carbon fiber-reinforced plastics, are very strong, lightweight, high performance materials used in the manufacture of vehicles, sporting goods, and consumer products, among others. The materials can be made in a variety of geometric forms and sizes by layering sheets of carbon fiber cloth into a mold in the shape of the final product followed by filling the mold with epoxy and curing. The type and alignment of the fibers are selected to optimize the strength and stiffness properties of the resulting composite material, and air may be evacuated from the mold prior to curing to enhance structural rigidity. The epoxy, which provides a structural matrix that is strengthened by carbon fibers, is commonly produced from a reaction between a phenol or cresol (e.g., bisphenol-A) and a crosslinking agent (e.g., epichlorohydrin).

Epoxy graphite composite materials are known to have excellent thermal cycling and mechanical fatigue properties. Unfortunately, the photon energy of ultraviolet components of ambient light (e.g., 290-400 nm), including sun light and artificial light sources that illuminate manufacturing facilities, are comparable to the dissociation energies of polymer covalent bonds found in epoxy graphite composite materials.

Ultraviolet ("UV") light absorbed by epoxy polymers causes photo-oxidative reactions that cause material degradation. UV-mediated polymer chain scission lowers the molecular weight of polymers giving rise to reduced strength and heat resistance. Likewise, UV-crosslinking causes excessive brittleness and results in microstructural defects. Exposure to ultraviolet light can also produce chromophores, which discolor the polymer, and autocatalytic degradation may be established if UV-absorbing chromophores are produced. Various photostabilizers can be added to polymers to inhibit degradation by UV radiation, but exposure to UV radiation may nevertheless result in significant degradation of mechanical properties, especially at high temperatures.

For relatively short periods of UV exposure, usually only changes in surface morphology are observed. However, for extended exposure to UV radiation, an epoxy graphite material may be severely degraded. The black surfaces of an epoxy graphite material exposed to UV radiation exhibit a distinct color change from black to dark green during early stages of UV-degradation. Often, the formation of green color serves as a convenient means for monitoring the degradation process. Changes in surface smoothness may also be visible by the naked eye upon UV irradiation.

The mechanical properties and structural integrity of epoxy graphite composite materials are generally resistant to moisture, but physical and chemical degradation by ultraviolet light may be aggravated by water exposure. Ultraviolet degradation of the surface of a composite material can provide pathways for ingress of moisture and chemical agents. Moreover, the presence of moisture can enhance photo-oxidation reactions resulting in polymer scission or crosslinking. Water vapor or condensation can also remove soluble products of photo-oxidation reactions from a UV-irradiated surface and thereby expose fresh surfaces susceptible to further degradation.

Components made from epoxy graphite composite materials that are used in manufacturing are therefore often protected from exposure to ultraviolet light, e.g., with a coating of primer. The production of composites is usually very expensive, requiring expert and skilled personnel. Despite prudent manufacturing techniques, it often happens that components made from epoxy graphite composite materials begin to degrade before being used or during a manufacturing process if conditions are not controlled, as evidenced by the appearance of the characteristic green surface color. Once the surface of a composite material begins to degrade, its surface properties become altered. For example, it is difficult to apply paint to a UV-degraded surface because of the loss of surface properties.

For small components, limited amounts of UV-damaged surface may be restored with sand paper or washing with a solvent-soaked rag, but such methods are not appropriate for large-scale industrial use. For example, it would be impractical to apply liquids to the underside of an airplane wing component (having a very large surface area) because dripping liquid would contaminate the work area, and the usefulness of such methods are limited by rapid solvent evaporation. Large volumes of free-flowing (i.e., liquid) organic solvents are undesirable because of the risk of fire or environmental contamination, protection of personnel, and the need for hazardous waste disposal. In order to be practical, any method of removing UV-degradation products should ideally conclude with a water-based wash step, such as washing with soap and water. Furthermore, the method should be applicable and practical for horizontal, vertical, and overhead surfaces.

Accordingly, a need exists for a method for restoring large surfaces of an epoxy graphite composite material that has been degraded by ultraviolet radiation.

SUMMARY

An embodiment of the present invention includes a process using environmentally friendly materials for restoring a surface of an graphite composite material that has been degraded by exposure to ultraviolet radiation. An example process includes steps of providing a gelled solvent composition, applying the gelled solvent composition to a degraded surface of a graphite composite material, and thereafter removing the gelled solvent composition to produce a restored surface. The process uses a novel gelled solvent composition comprising one or more non-halogenated organic solvents, a thickening agent, an abrasive agent, and water; wherein the gelled solvent composition has an evaporative weight loss that is lower than the evaporative weight loss of the one or more non-halogenated solvents.

When not coated with paint or when directly exposed to UV, the surfaces of graphite composite materials, especially epoxy graphite composite materials, used in the manufacture of sporting goods, vehicles, e.g., cars, trucks, buses, railroad, marine vessels, aerospace vehicles including airplanes, among others, may become degraded by exposure to UV light, but as described herein, such UV-degraded materials may be restored using a cost-effective, safe, environmentally friendly gelled solvent composition specifically formulated for restoration of UV-degraded composite surfaces. The methods and compositions herein overcome deficiencies of known methods and materials, and provide for the reduced use of large volumes of organic solvents, compatibility with a final optional water-based wash step, e.g., with soap and water, or washing with any other acceptable cleaning solution, and suitability for use on horizontal, vertical, and overhead surfaces.

In an exemplary embodiment, the invention includes a method of restoring a surface of a graphite composite material comprising steps of (1) providing a gelled solvent composition comprising one or more non-halogenated organic solvents, a thickening agent, an abrasive agent, and water, wherein the gelled solvent composition has an evaporative weight loss that is lower than the evaporative weight loss of the one or more non-halogenated solvents; (2) applying the gelled solvent composition to a degraded surface of a graphite composite material; and thereafter (3) removing the gelled solvent composition to produce a restored surface. The method may further comprise a step of scouring the degraded surface, whereby the abrasive agent is used to abrade the surface and thereby remove any residual UV-degradation products.

In another embodiment, a gelled solvent composition is applied to a surface of a graphite composite material that comprises a UV-degradation product(s); followed by a step of waiting for a sufficient amount of time to lapse during which the degradation product(s) becomes incorporated into the gelled solvent composition; followed by removing the gelled solvent composition to produce a restored substrate; and inspecting the restored substrate. The amount of time during which the gelled solvent composition is in contact with the surface depends on the nature of the degradation products, the relative amount and identity of the solvent, and the like. The length of time should be sufficient to permit the solvent to soften or dissolve the degradation product(s). Suitable times include but are not limited to 10 minutes, 20 minutes, 30 minutes, or longer, but not so long that the gelled solvent composition becomes substantially dry.

The invention also relates to a novel gelled solvent composition. A gelled solvent composition may have viscosity and handling characteristics adapted for mechanized application to horizontal, vertical, and overhead surfaces, such as are encountered in major aircraft manufacture. In preferred embodiments, a gelled solvent composition effectively removes UV-degradation products and restores or repairs a composite surface (e.g., restores surface properties) so that, e.g., paint may be effectively applied or removed. Other features include a gelled solvent composition having improved flammability, explosion, pH, and health characteristics. In another aspect, a gelled solvent composition may be compatible with common waste treatment and disposal methods. An example gelled solvent composition comprises a mixture of solvents (e.g., acetone, acetyl acetone, methyl propyl ketone, and methyl ethyl ketone), an optional indicator dye (e.g., methylene blue), an abrasive (e.g., pumice or talc), a thickener (e.g., fumed silica such as Cabosil®), and water. In an embodiment, the gelled solvent composition is thixotropic and has vapor pressure and solvent drying properties that permit a solvent dwell time on composite surfaces sufficient for UV-degradation products to be adequately removed.

The methods and gelled solvent compositions described herein overcome prior art deficiencies. Other features and advantages will be apparent from the following more detailed description of preferred embodiments, taken in conjunction with the accompanying drawings, which illustrate, by way of example, the principles of the invention.

DETAILED DESCRIPTION

In an embodiment, the present invention includes a process for restoring a surface of an epoxy graphite composite material that has been degraded by exposure to ultraviolet radiation, as well as novel gelled solvent compositions comprising mixtures of solvent(s), thickening agent(s), and abrasive agent(s) that are formulated to remove UV-degradation products from surfaces of composite parts. Advantageous features include reduced need for sanding or other manual abrading, reduced amounts of volatile solvents, and applicability to the restoration of complex parts and contours. The methods are especially useful in the restoration of composite materials used for the manufacture of aircraft and other vehicles, the components of which are exposed to ultraviolet radiation (from natural sunlight and factory lighting) during their manufacture. Methods are provided for removing and eliminating the negative effects of UV-degradation products, making it possible to mitigate UV damage on airplane component surfaces that are curved, inclined, or inverted, without excessive use of volatile chemicals.

Figure 1:
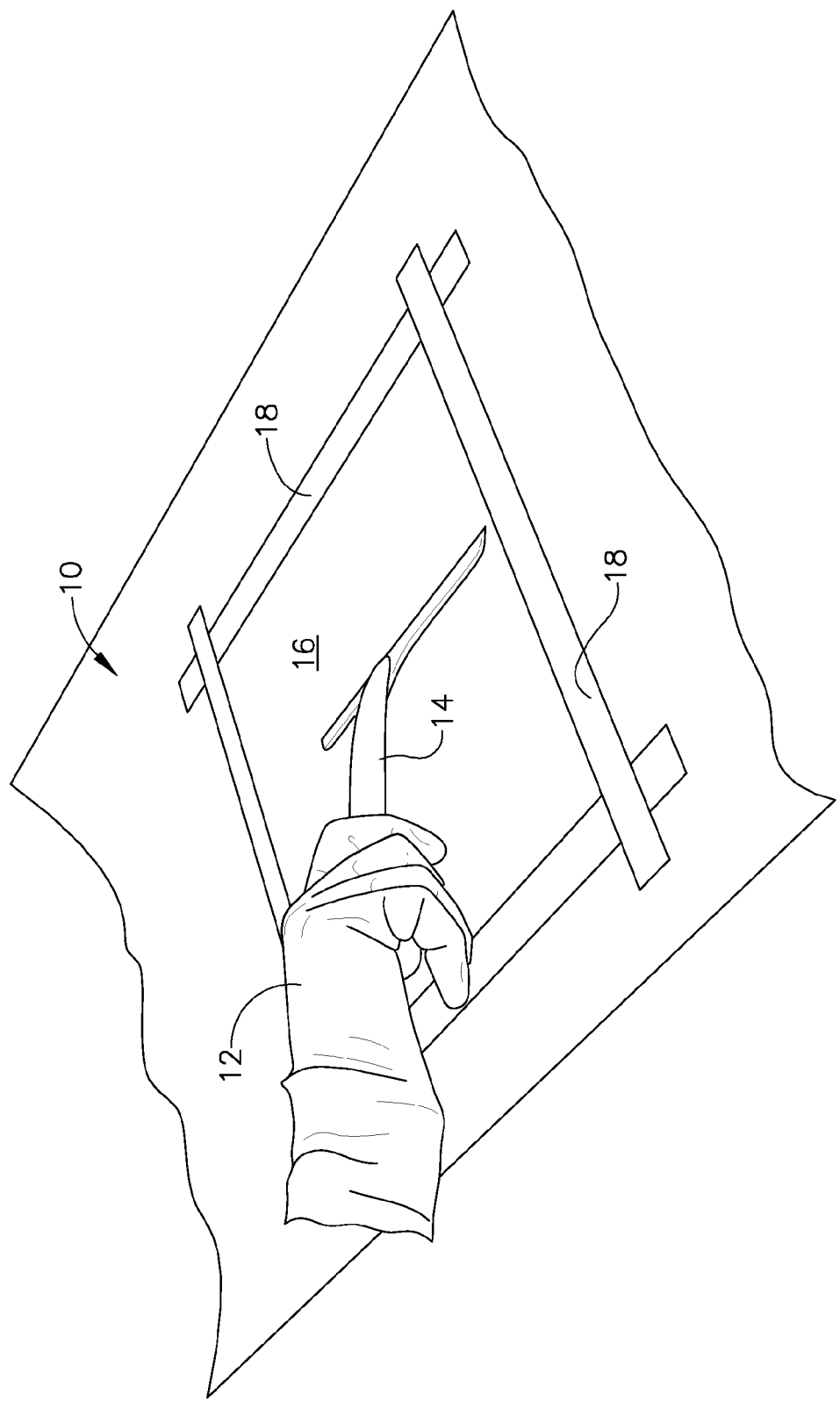
FIGS. 1-4 depict steps of an example method of restoring a UV-degraded surface of an epoxy graphite composite material according to an embodiment of the invention.

An example embodiment includes a multi-step process for restoring a surface of an epoxy graphite composite material that has been degraded by exposure to ultraviolet radiation. Referring to the accompanying drawings, in FIG. 1 a sample UV-degraded substrate is fixed to a workbench (10) by tape (18) and then a thin coat (about 1 cm thickness) of gelled solvent composition (16) is applied by hand (12) using an applicator tool (14). For example, the substrate may be a graphite epoxy composite material that has been exposed to ultraviolet light.

Figure 2:
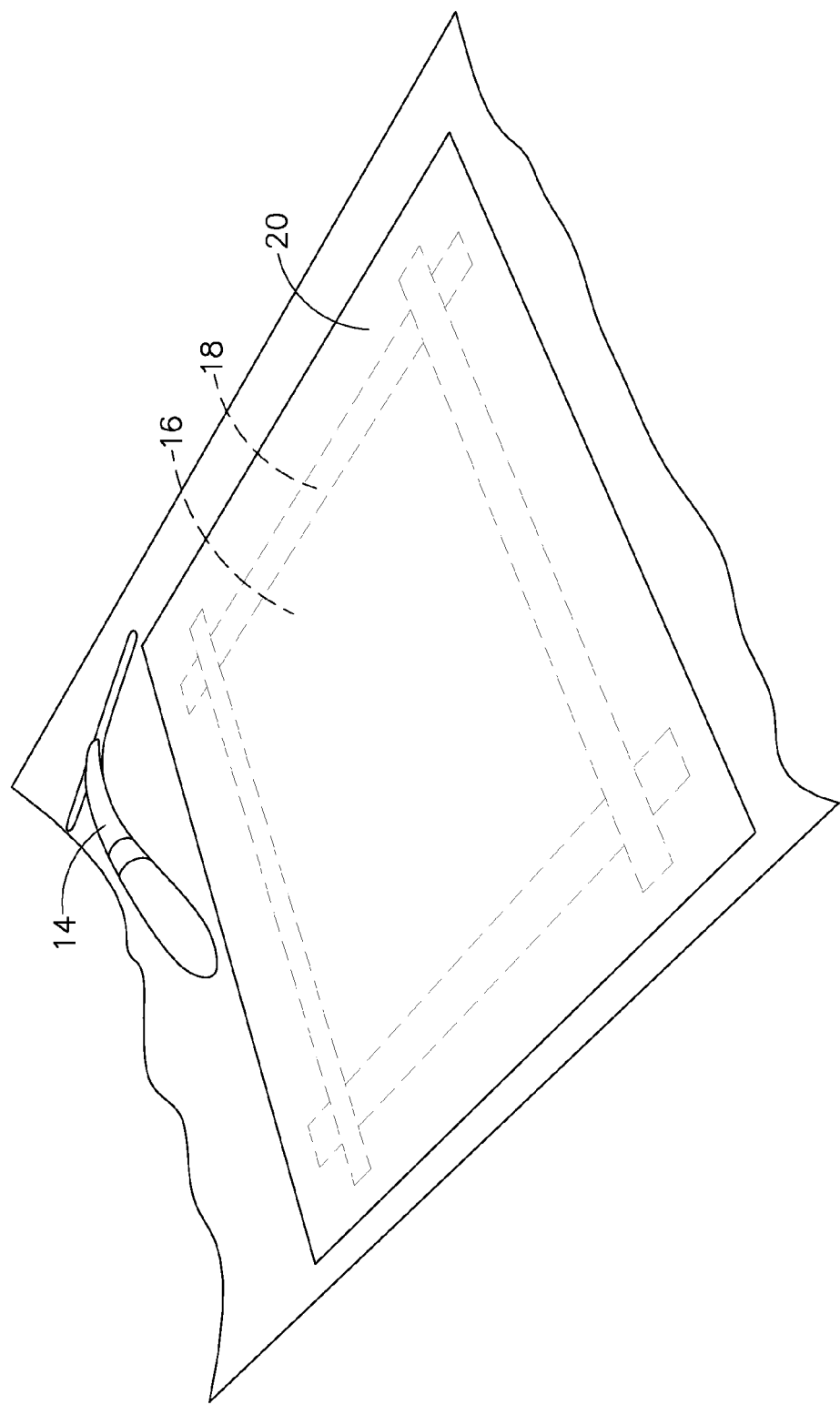

FIG. 2 depicts a subsequent optional step, in which a drop cloth (20) is laid down over the coated sample substrate, and approximately five to twenty minutes is permitted to lapse to facilitate infiltration of the gelled solvent composition (16) into the UV-degradation products. The optional drop cloth (20) may prevent excessive or premature drying of the gelled solvent composition (16).

Figure 3:
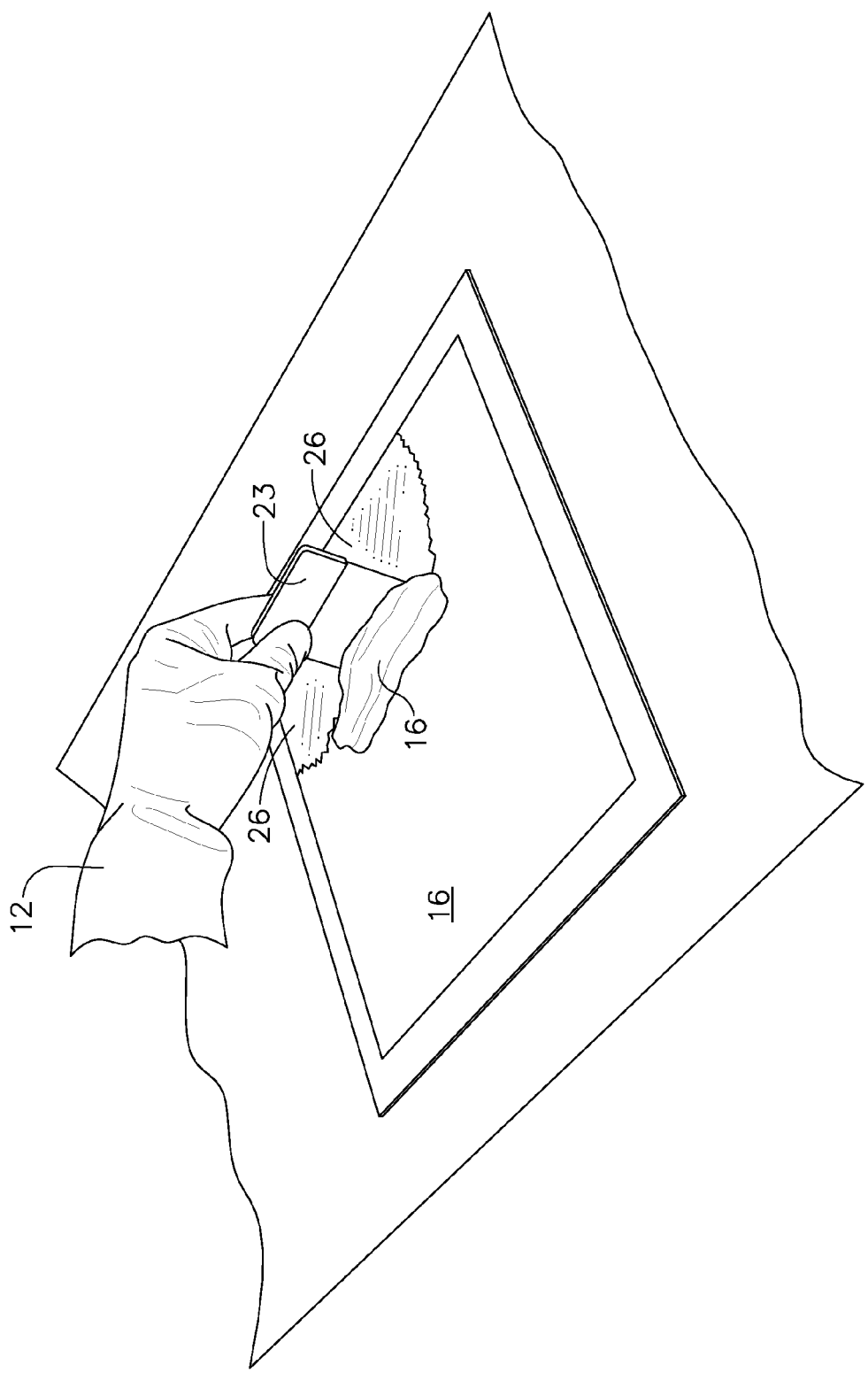

FIG. 3 depicts an additional step, in which the gelled solvent composition (16) is scraped off the substrate by hand (12) using a scraping tool (23) to reveal a restored substrate (26), which is substantially free of UV-degradation products. During this step, the abrasive component of the gelled solvent composition may be employed to abrade the surface.

Figure 4:
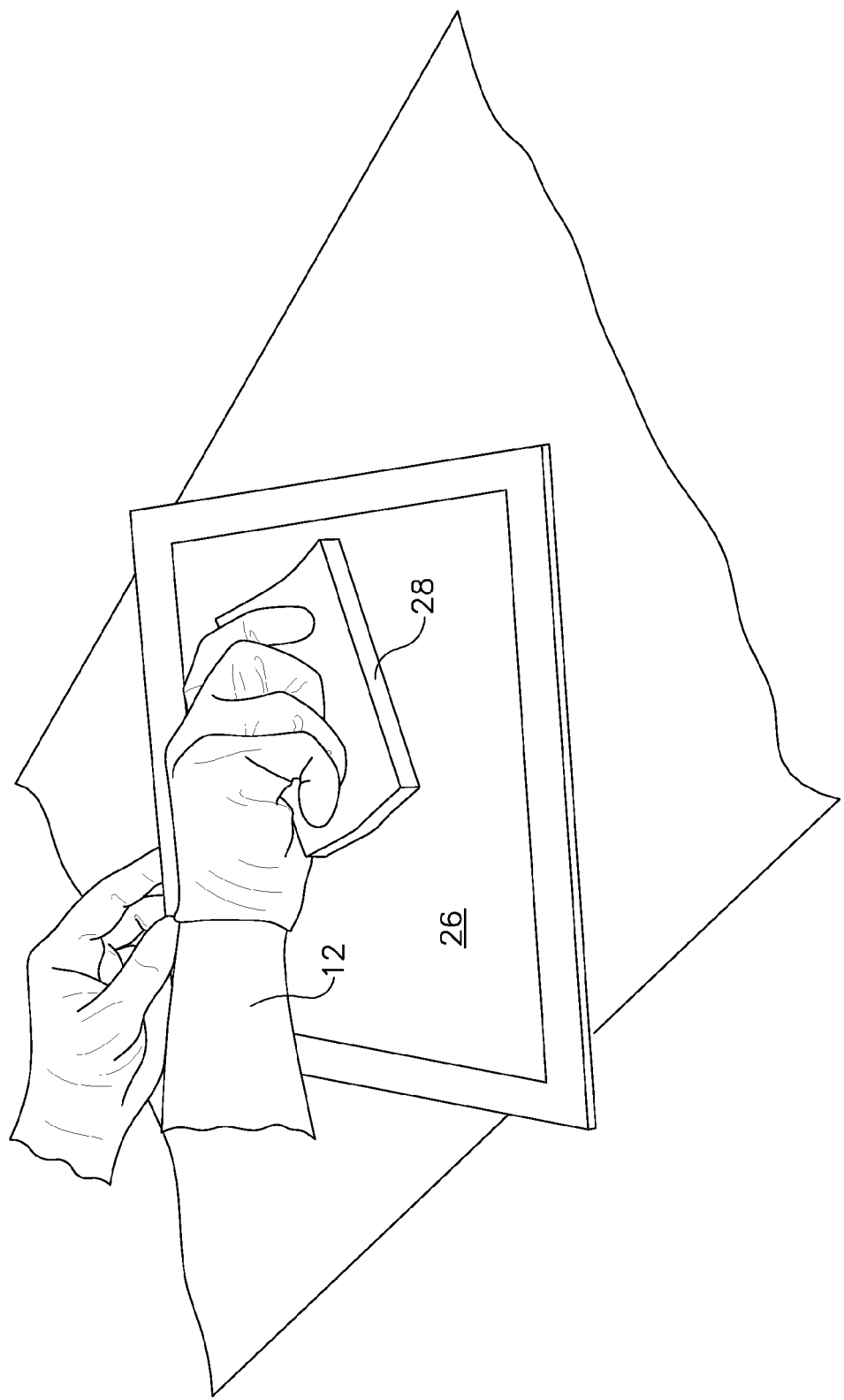

FIG. 4 depicts a final step of restoring an epoxy graphite composite surface, in which a restored substrate (26) is cleaned with a scrubbing pad (28) using an aqueous solution of liquid (hand) dish washing detergent and tap water, or another compatible cleaning solution.

Accordingly, in an embodiment, the invention includes a method of restoring a surface of an epoxy graphite composite material comprising steps of (1) providing a gelled solvent composition comprising one or more non-halogenated organic solvents, a thickening agent, an abrasive agent, and water, wherein the gelled solvent composition has an evaporative weight loss that is lower than the evaporative weight loss of the one or more non-halogenated solvents; (2) applying the gelled solvent composition to a UV-degraded surface of a graphite composite material; and (3) thereafter removing the gelled solvent composition to produce a restored surface. Prior to removing the gelled solvent composition, a sufficient amount of time is permitted to lapse during which the UV-degradation products dissolve or become incorporated into the gelled solvent composition. The gelled solvent composition is then removed to produce a cleaned substrate.

A further optional step includes scouring (or abrading) the UV-degraded surface. The abrasive agent of the gelled solvent composition provides a means for removing residual degradation products without the need for sand paper or emery cloth. The scouring step may remove an outer layer of the surface (e.g., about 0.25 mm to 0.50 mm) and ideally removes small surface defects, such as roughness or pin holes, and thereby prepares a smooth surface suitable for receiving paint. Of course, if the composite material contains a scrim or other integral structures, then the scouring step preferably does not expose them. The method may also include the step of washing the cleaned substrate with an aqueous solution, such as tap water and liquid dish washing detergent or any other solvent or cleaning solution. In, e.g., arid regions of the world where use of an aqueous solution is not practical, a non-aqueous solution such as a non-halogenated organic solvent may be used. UV-degradation products incorporated into the gelled solvent composition may not flush with water, and therefore after application they should be scraped off, along with incorporated degradation products, and then disposed of as solvent-containing waste.

While not wishing to be bound by theory, the inventors postulate that epoxy UV-degradation products may include a quinone, hydroquinone, or alkyl ketone epoxy degradation product (which is thought to cause the characteristic green color), and therefore the restored surface is essentially free (or has a reduced amount) of these degradation products. In another embodiment, a UV-degraded surface has a green color, and a restored surface has a reduced amount of green color as determined by visual inspection. In still another embodiment, a restored surface has improved paint adhesion properties compared to a degraded surface. A UV-degraded surface may comprise an epoxy ultraviolet-light degradation product having an infrared spectrum comprising an absorption peak in the region of from about $1690$ $cm^{-1}$ to about $1660$ $cm^{-1}$, that is, the characteristic C═O infrared absorption band, and a restored surface has a lower IR absorption in this region than a UV-degraded surface. The infrared absorption characteristics may be determined by attenuated total reflectance ("ATR") in conjunction with infrared spectroscopy, which permits samples to be examined directly in the solid state without further preparation. In a typical experiment, a beam of infrared light is passed through an ATR crystal that is pressed into contact with a sample in such a way that light reflects off an internal surface in contact with a solid sample. This reflection forms an evanescent wave that extends into the sample, e.g., by a few microns, and the beam is then collected by a detector as it exits the crystal. Accordingly, in another embodiment, a degraded surface comprises an epoxy degradation product and a restored surface has a reduced amount of the degradation product as determined by (Fourier transform) infrared spectroscopy.

A variety of graphite composite materials may be restored, especially epoxy graphite composite materials intended for use in the manufacture of, or forms at least a portion of, a terrestrial, aquatic, or aerospace vehicles. During the manufacture of such vehicles, large epoxy composite components (e.g., panels, drums, doors, hoods, bodies, and the like) may be exposed to ultraviolet light in manufacturing facilities thereby causing UV-degradation. In an embodiment, the invention provides a method for restoring such expensive components. Accordingly, the invention has many applications in aerospace and automotive fields, as well as in the manufacture of sailboats, and notably in modern bicycles, where these qualities are of importance. Furthermore, graphite composite materials are increasingly common in small consumer goods as well, such as laptop computers, tripods, fishing rods, racquet sports frames, stringed instrument bodies, classical guitar strings, and drum shells.

In another embodiment, the invention provides a gelled solvent composition comprising one or more non-halogenated organic solvents, a thickening agent, an abrasive agent, and water; wherein the gelled solvent composition has an evaporative weight loss that is lower than the evaporative weight loss of the one or more non-halogenated solvents. The addition of the thickening agent to a gelled solvent composition is believed to reduce the vapor pressure of the non-halogenated organic solvent(s) and therefore to increase the drying time so that sufficient time may lapse during which the solvent(s) dissolve UV-degradation products. The thickening agent is non-reactive, and it imparts a reduction in the rate of evaporative weight loss of the solvents.

For example, a gelled solvent composition may comprise the following components in these relative amounts (component percentages given herein are weight percentages):

| COMPONENT | RELATIVE AMOUNT (by weight) |
|---|---|
| one or more non-halogenated organic solvents | 60-90% |
| thickening agent | 0.5-10% |
| abrasive agent | 0.5-10% |
| water | 10-60% |
| other components including surfactant, etc. | <10% |

In an embodiment, the one or more non-halogenated organic solvents may comprise a low molecular weight alkyl ketone, a low molecular weight alkyl alcohol, or a combination thereof. For example, the low molecular weight alkyl ketone may a $C_3$-$C_8$ ketone, e.g., the low molecular weight alkyl ketone may be selected from the group consisting of acetone, acetylacetone, methyl propyl ketone, methyl ethyl ketone, and combinations thereof. Similarly, the low molecular weight alkyl alcohol may be a $C_1$-$C_6$ alcohol, e.g., the low molecular weight alkyl alcohol may be selected from the group consisting of isopropanol, ethanol, and combinations thereof.

In another embodiment, the invention includes a gelled solvent composition comprising two or more non-halogenated organic solvents. In some cases, a binary solvent system may be preferred; that is, the gelled solvent composition comprises two non-halogenated organic solvents (in addition to water). It should be noted that a gelled solvent composition may be provided in a solvent-free or concentrated form, which may be reconstituted with non-halogenated organic solvents or water prior to use. In preferred embodiments, a gelled solvent composition is essentially free (e.g., less than 1% by weight, or less than 0.1% by weight, or even about 0% by weight) of halogenated organic solvents, such as methylene chloride, chloroform, and carbon tetrachloride (or other chlorinated hydrocarbons); and the gelled solvent composition is readily dispersible in water.

The thickening agent of a gelled solvent composition may be any inert colloidal solid material that disperses completely in water, such as fumed silica, cellulose, or a cellulose derivative, e.g., cellulose ethers, such as hydroxypropyl methyl cellulose, hydroxypropyl ether cellulose, hydroxymethyl cellulose, or a combination thereof. An example thickening agent is CARBOSIL®, which is a trademark of Polymer Technology Group, Inc. (Berkeley, Calif.) for fumed silica. In another embodiment, the thickening agent is a non-abrasive gelling agent selected from the group consisting of talcum, silica, cellulose, a cellulose derivative, and combinations thereof.

The abrasive agent may be selected from a wide variety of materials of adequate hardness and of a particle size range that will enable them to effectively scour composite surfaces while remaining homogeneously dispersed throughout the gel during preparation and storage. The abrasive agent provides means for both scouring and a polishing. In an embodiment, the abrasive agent is a particulate abrasive mineral solid having an average particle diameter of from about 200 μm to about 20 μm (e.g., from about 160 μm to about 100 μm). For example, the abrasive agent may be selected from the group consisting of pumice, aluminium oxide (corundum or alumina), garnet, emery, silicon carbide (carborundum), silicon oxide (silica), zirconium oxide (zirconia), chromium oxide (chromia), and combinations thereof.

A gelled solvent composition may also comprising an additive selected from the group consisting of a surfactant, an indicator dye, a buffer, a metal complexing agent, an emulsifier, a perfume, and combinations thereof.

The surfactant of a gelled solvent composition may be a combination of anionic surfactants (e.g., sodium dodecyl sulfate, ammonium lauryl sulfate, and sodium laureth sulfate) and nonionic surfactants (e.g., octyl glucoside, decyl maltoside, cetyl alcohol, and oleyl alcohol), such as those commonly found in liquid (hand) dish washing detergent. See, e.g., U.S. Pat. Nos. 4,556,509, 5,990,065, and 6,069,122, all of which are incorporated herein by reference. An example surfactant is JOY® liquid dish washing detergent, which is a trademark of The Procter & Gamble Company (Cincinnati, Ohio).

For example, suitable anionic detergents include $C_8$-$C_{18}$ alkyl sulfates, sulfonates, and carboxylates, especially alkyl sulfates containing 10-16 carbons in the alkyl group; $C_9$-$C_{15}$ alkylbenzene sulfonates wherein the alkyl group is either a straight chain or a branched chain, such as sodium dodecylbenzene sulfonate; $C_8$-$C_{22}$ olefin sulfonates, especially olefin sulfonates containing from 12-22 carbon atoms in the alkenyl group such as $C_{14-17}$ olefin sulfonate; $C_8$-$C_{18}$ alkyl ether ethylenoxy sulfates of the formula $R(OC_2H_4)_nOSO_3M$, wherein n is 1-12 and preferably 1-6, R is an alkyl group containing 8-18 carbon atoms and preferably 10-16 carbons, and M is a cation, such as sodium or ammonium, such as ammonium lauryl triethoxy ether sulfate; $C_{10}$-$C_{20}$ paraffin sulfonates especially alkane sulfonates containing 14-17 carbon atoms in the alkyl group, such as sodium $C_{14-17}$ paraffin sulfonate; $C_6$-$C_{12}$ phenyl ether polyethylenoxy sulfates, especially sulfonates having 8-12 carbons in the alkyl group, such as ammonium nonylphenyl tetraethenoxy ether sulfate; $C_8$-$C_{12}$ alkyl sulfonacetates corresponding to the formula $RO_2CH_2SO_3M$, wherein R is a $C_8$-$C_{18}$ alkyl especially sulfoacetates containing 12-16 carbon atoms in the alkyl group; N-mono-$C_8$-$C_{22}$ alkyl or alkenyl, including alkyl or alkenyl groups interrupted by an ether or amido group, sulfosuccinates, including disodium N-mono-$C_8$-$C_{18}$ acylisopropanolamidnosulfosuccinate, disodium lauryl sulfosuccinate, and N-monooleylisopropanolamidosulfosuccinate; N—$C_8$-$C_{18}$ acyl taurines, especially taurates containing 12-14 carbon atoms in an acyl group; and O—$C_8$-$C_{18}$ acyl isethionates, such as isethionates containing 12-14 carbon atoms in an acyl group.

Example nonionic surfactants include the ethoxylated fatty alcohols having 8-18 carbon atoms; ethoxylated alkylphenols having 6-12 carbons in the alkyl group; ethoxylated fatty alkanolamides having the structure $R^1CONR^2R^3(EtO)_x$, wherein $R^1CO$ is an acyl group containing 6-18 carbon atoms, $R^2$ is an H, $CH_3$, or $CH_2CH_2OH$ group, $R^3$ is a $CH_3$, $CH_2CH_2OH$, or a $CH_2CHOHCH_3$ group, and x is an integer from 0-20; and ethoxylated lanolin derivatives and ethoxylated sorbitans, including fatty acid esters of sorbitol having 10-18 carbon atoms in the fatty acid group. Other suitable nonionic detergents include the trialkyl polar amine oxides having the formula $R^1R^2R^3N \rightarrow O$ wherein $R^1$ is a $C_8$-$C_{18}$ alkyl, alkenyl, or hydroxy alkyl group and $R^2$ and $R^3$ are each methyl, ethyl, propyl, ethanol, or propanol or $R^2$ and $R^3$ are joined together with the nitrogen atom to form a morpholino group, such as lauric-myristic monoethanolamide, lauric-myristic diethanolamide, and lauryl dimethyl amine oxide.

A gelled solvent composition may also include an indicator dye, such as methylene blue or a food coloring. When a gelled solvent composition comprises an indicator dye the cleaned substrate may be inspected for the presence of the retained indicator dye, which indicates that a surface has not been sufficiently cleaned. Generally, only a small quantity of indicator dye is necessary, e.g., less than 1% by weight, or even less than 0.1% by weight. An indicator dye should be soluble in the solvent components of the gelled solvent composition.

Many absorbable organic and organometallic indicator dyes, especially blue-colored dyes, are useful for general applications, i.e., where the substrate is not blue. The dye is observable indicator of remaining adhesive residue when there exists a color contrast between the substrate and the absorbed dye. In a typical embodiment, the other components of a gelled solvent composition are white or colorless. The indicator dye may therefore be customized for the unique requirements of specific applications. Several useful dyes of various colors are commercially available from Eager Plastics, Inc. (Chicago, Ill.), including "Hi-Bright Red," "Ruby Red," "Old Rose," "Scarlet Red," "Shocking Pink," "Magenta," "Violet," "Bright Purple," "Bright Orange," "Honey Brown," "Light Brown," "Brilliant Blue," "Royal Blue," "Turquoise," "Kelly Green," "Lime Green," "Fluorescent Yellow," "Lemon Yellow," "Fluorescent Lime," "Avocado Green," and "Aztec Gold." Further example indicator dyes include food coloring, such as brilliant blue FCF (FD&C Blue No. 1), indigotine (FD&C Blue No. 2), fast green FCF (FD&C Green No. 3), allura red AC (FD&C Red No. 40), erythrosine (FD&C Red No. 3), tartrazine (FD&C Yellow No. 5), and sunset yellow FCF (FD&C Yellow No. 6). Other examples of indicator dyes may be found in the U.S. Food and Drug Administration's list of substances Generally Recognized As Safe ("GRAS"), the Food Additive Status List, and the Color Additive Status List.

Further components of a gelled solvent composition may include additives, such as pH modulating (i.e., buffering) agents; metal complexing (i.e., chelating) agents, such as EDTA or DTPA; emulsifiers; perfumes; and the like. In an advantageous embodiment, a 5% by weight suspension of a gelled solvent composition in water has a pH of about 6 to about 8, or between about 6 and about 7. In preferred embodiments, a 5% by weight suspension of a gelled solvent composition in water has a pH essentially the same as the pH of tap water. In another embodiment, a gelled solvent composition is thixotropic and a 5% by weight suspension thereof in water has a pH of from about 6 to about 8.

The relative quantities of the components of a gelled solvent composition are selected so that the composition is efficacious in the methods described herein. For use in large-scale industrial applications, the relative amounts of the components may be selected in order to produce a composition that is thixotropic or a composition that has a viscosity of about 500 to about 1000 poise (e.g., 600 or 700 poise), in which case it may be readily applied to a large substrate such as the underside of an airplane wing. In such applications, the gelled solvent composition should have sufficiently high viscosity to cling to overhead or vertical surfaces but thin enough for easy application. Likewise, a gelled solvent composition may be formulated from components in the proportions given herein in order to yield a smooth, homogeneous gel that is resistant to syneresis or phase separation. The gel can readily be applied to surfaces in a controlled fashion, e.g., with an applicator where it scours away hardened UV-degradation products and removes them without undue abrasion. The residue is readily rinsed from the restored surface.

The various components described hereinabove can be combined to yield the present gelled solvent compositions by adding them together while mixing or agitating. The pH may be adjusted, e.g., to neutral (about 7.0-7.5), followed by addition of fragrance or dye, if any. Mixing is continued until a uniform, thick gel results. The finished product may be stored in wide-mouthed, sealed containers, or it may be used immediately. In use, the desired amount of gelled solvent composition is removed from a container, e.g., by contacting it with an applicator, and it is manually applied to a surface. Following cleaning, the residue is rinsed away with water, leaving the target surface clean and free of UV-degradation products.

The invention is further illustrated by the following examples, which should not be construed as further limiting.

EXAMPLES

An example gelled solvent composition is made my mixing the following components in these relative amounts:

| COMPONENT | RELATIVE AMOUNT (by weight) |
|---|---|
| acetone | 60-90% |
| water | 10-60% |
| silica | 0.5-10% |
| alumina | 0.5-10% |
| indicator dye | <1% |
| other components including surfactant, etc. | <10% |

Yet another example gelled solvent composition consists essentially of 7.5 g fumed silica, 5.0 g alumina, 70 mL acetone, and 30 mL water per 100 mL.

Figure 5:
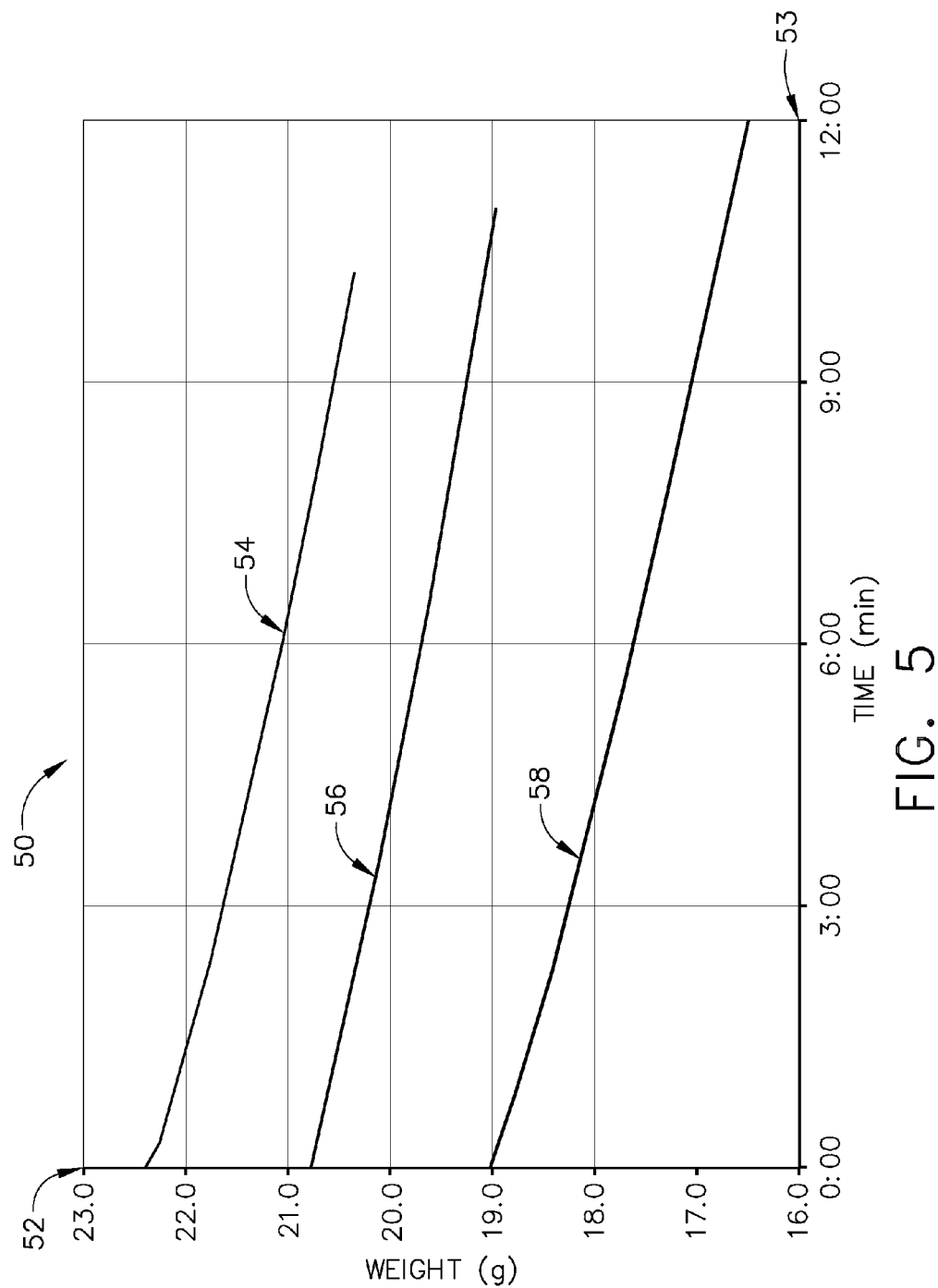
FIG. 5 illustrates relative rates of evaporative weight loss according to an embodiment of the invention.

Referring to FIG. 5, the reduction in evaporative weight loss is illustrated. In a plot (50) of time (53) by weight (52), the slope (rate of evaporative weight loss) of the line (a linear regression best fit line) for a gelled 80:20 acetone:water mixture (56) was 21.13% lower than the slope of a line for acetone alone (58). Likewise, the slope of a line for a 80:20 acetone:water mixture (54) was 7.68% lower than the slope of a line for acetone alone (58). Accordingly, the slope of the line for the gelled solvent composition (56) indicates an evaporative weight loss that is lower than the evaporative weight loss of the one or more non-halogenated solvents without silica as a thickening agent.

Figure 6:
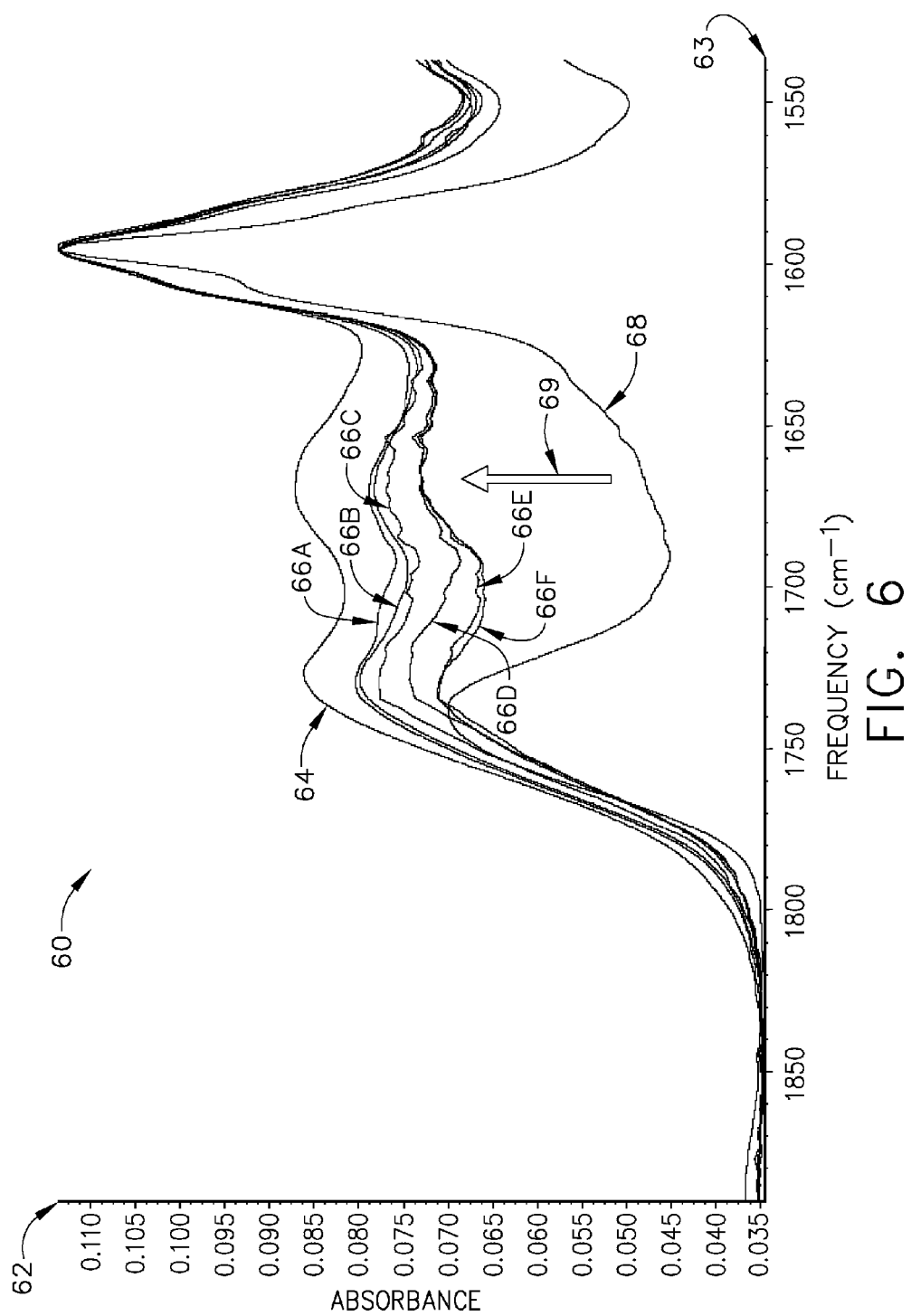
FIG. 6 illustrates an infrared absorption spectrum according to an embodiment of the invention.

FIG. 6 illustrates the restoration of a UV-degraded epoxy composite surface resulting in a surface that has a reduced amount of UV-degradation products as determined by infrared ("IR") spectroscopy. In a plot of infrared absorbance (62) by frequency (63), in wave numbers ($cm^{-1}$), a reduction in the infrared absorption spectrum (60) is marked with an arrow (69). The ATR FT-IR spectrum for a UV-degraded epoxy graphite composite panel (64) showed a strong absorption at approximately 1670 $cm^{-1}$, which was not observed in the IR spectrum for an identical panel (68) that was not exposed to UV light. Several different gelled solvent compositions were used to restore a UV-degraded epoxy graphite composite panel, with each showing a reduction in the characteristic absorption at approximately 1670 $cm^{-1}$. The gelled solvent compositions included 70:30 acetone:water (66A), 80:20 acetone:water (66B), 40:30:15:15 methylethyl ketone:acetone:isopropanol:water (66C), 50:20:15:15 acetone:methylpropyl ketone:detergent:water (66D), 25:25:25:25 methylpropyl ketone:methyl ethyl ketone:detergent:water (66E), and 70:15:15 actone:detergent:water (66F), wherein the detergent was a glycol ether detergent ("PACE B-82" from Nalco Co. of Naperville, Ill.).

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

The invention claimed is:

1. A method of restoring a surface of a graphite composite material comprising steps of
providing a gelled solvent composition comprising one or more non-halogenated organic solvents selected from a group consisting essentially of one or more low molecular weight alkyl ketones, a thickening agent, an abrasive agent having an average particle diameter of from about 20 µm to about 200 µm, and water in a gelled state, wherein said gelled solvent composition is in a gelled state and has an evaporative weight loss that is lower than the evaporative weight loss of said one or more non-halogenated solvents;
applying said gelled solvent composition to a UV-degraded surface of a graphite composite material; and thereafter
removing said gelled solvent composition to produce a restored surface.

2. The method of claim 1 further comprising a step of scouring said UV-degraded surface.

3. The method of claim 1, wherein said UV-degraded surface comprises a quinone, hydroquinone, or alkyl ketone epoxy degradation product and said restored surface has a reduced amount of said degradation product as determined by infrared spectroscopy.

4. The method of claim 1, wherein said UV-degraded surface comprises an epoxy ultraviolet-light degradation product having an infrared spectrum comprising an absorption peak in the region of from about 1690 $cm^{-1}$ to about 1660 $cm^{-1}$.

5. The method of claim 1, wherein said graphite composite material forms at least a portion of a terrestrial, aquatic, or aerospace vehicle.

6. A gelled solvent composition comprising one or more non-halogenated organic solvents selected from a group consisting essentially of one or more low molecular weight alkyl ketones, a thickening agent, an abrasive agent having an average particle diameter of from about 20 µm to about 200 µm, and water; wherein said gelled solvent composition is in a gelled state and has an evaporative weight loss that is lower than the evaporative weight loss of said one or more non-halogenated solvents.

7. The gelled solvent composition of claim 6, wherein the one or more low molecular weight alkyl ketones is present in an amount of from 60-90% by weight.

8. The gelled solvent composition of claim 6, wherein the one or more low molecular weight alkyl ketones is a $C_3$-$C_8$ ketone.

9. The gelled solvent composition of claim 6, wherein the one or more low molecular weight alkyl ketones is selected from the group consisting of acetone, acetylacetone, methyl propyl ketone, methyl ethyl ketone, and combinations thereof.

10. The gelled solvent composition of claim 6, wherein said thickening agent comprises a non-abrasive gelling agent selected from the group consisting of talcum, silica, cellulose, a cellulose derivative, and combinations thereof.

11. The gelled solvent composition of claim 6, wherein said abrasive agent is selected from the group consisting of pumice, aluminium oxide (corundum or alumina), garnet, emery, silicon carbide (carborundum), silicon oxide (silica), zirconium oxide (zirconia), chromium oxide (chromia), and combinations thereof.

12. The gelled solvent composition of claim 6 further comprising an additive selected from the group consisting of a surfactant, an indicator dye, a buffer, a metal complexing agent, an emulsifier, a perfume, and combinations thereof.

13. The gelled solvent composition of claim 12, wherein said additive is a surfactant comprising a combination of anionic and nonionic surfactants.

14. The gelled solvent composition of claim 12, wherein said indicator dye is methylene blue or a food coloring.

15. The gelled solvent composition of claim 6, wherein said gelled solvent composition is thixotropic and a 5% by weight suspension thereof in water has a pH of from about 6 to about 8.

16. A gelled solvent composition comprising the following components:

| COMPONENT | RELATIVE AMOUNT (by weight) |
| --- | --- |
| one or more non-halogenated organic solvents | 60-90% |
| thickening agent | 0.5-10% |
| abrasive agent | 0.5-10% |
| water | 10-60% |
| other components including surfactant, etc. | <10% | wherein the gelled solvent composition is in a gelled state.

17. The gelled solvent of claim 16, wherein said other ingredients comprise a metal complexing agent, an emulsifier, a perfume, and combinations thereof.

18. The gelled solvent composition of claim 16, wherein said other ingredients comprise a surfactant comprising a combination of anionic and nonionic surfactants.

* * * * *